（12） United States Patent
Hwang et al.

(10) Patent No.: US 7,983,238 B2
(45) Date of Patent: *Jul. 19, 2011

(54) METHOD FOR BRANCHING DATA IN MOBILE COMMUNICATION TERMINAL

(75) Inventors: In Tae Hwang, Kyonggi-do (KR); Sang Rim Shin, Kyonggi-do (KR); Myoung Jin Ok, Seoul (KR)

(73) Assignee: LG Electronics Inc., Seoul (KR)

( * ) Notice: Subject to any disclaimer, the term of this patent is extended or adjusted under 35 U.S.C. 154(b) by 412 days.

This patent is subject to a terminal disclaimer.

(21) Appl. No.: 12/271,202

(22) Filed: Nov. 14, 2008

(65) Prior Publication Data

US 2009/0103514 A1    Apr. 23, 2009

Related U.S. Application Data

(60) Division of application No. 11/699,987, filed on Jan. 31, 2007, now Pat. No. 7,782,833, which is a continuation of application No. 11/029,487, filed on Jan. 6, 2005, now Pat. No. 7,295,529, which is a continuation of application No. 09/406,844, filed on Sep. 29, 1999, now abandoned.

(30) Foreign Application Priority Data

Oct. 1, 1998    (KR) .................................. 98-041481

(51) Int. Cl.
    *H04B 7/00* (2006.01)
    *H04B 7/212* (2006.01)
(52) U.S. Cl. ........ 370/348; 370/310; 370/338; 370/352; 370/353; 455/452.1
(58) Field of Classification Search ................. 370/348, 370/338, 310, 352, 322–324, 384–388, 376, 370/334–335, 382–383, 329–332, 442; 455/452.1, 455/450–453, 445, 510, 511, 62–63.3, 67.11, 509, 426.1

See application file for complete search history.

(56) References Cited

U.S. PATENT DOCUMENTS 5,640,395 A    6/1997    Hamalainen et al. ......... 370/322
(Continued)

FOREIGN PATENT DOCUMENTS

WO    WO 97/00568    1/1997
(Continued)

OTHER PUBLICATIONS

European Office Action dated Dec. 23, 2004.
(Continued)

*Primary Examiner* — Pablo Tran
(74) *Attorney, Agent, or Firm* — Ked & Associates, LLP

(57) ABSTRACT

A method for branching data in a mobile communication terminal to perform data communication between a mobile station and a network which have media access control sublayers. In a data sending mode, each of the media access control sublayers of the mobile station and network attaches logical channel types based on traffic characteristic information and a radio bearer status to a media access control header contained in data to be sent. Then, each of the media access control sublayers branches the data to be sent, to transport channels corresponding to the attached logical channel types. In a data receiving mode, each of the media access control sublayers determines logical channels corresponding to logical channel types of a media access control header contained in received data. Then, each of the media access control sublayers branches the received data to the determined logical channels. Each of the media access control sublayers performs mapping and multiplexing/demultiplexing between logical channels and transport channels according to traffic characteristics to branch data. Therefore, it is possible to efficiently provide various multimedia and packet services.

16 Claims, 2 Drawing Sheets

U.S. PATENT DOCUMENTS

| | | | | |
|---|---|---|---|---|
| 5,729,541 | A | 3/1998 | Hamalainen et al. | 370/337 |
| 5,745,837 | A | 4/1998 | Fuhrmann | 455/5.1 |
| 5,754,537 | A | 5/1998 | Jamal | 370/330 |
| 6,236,646 | B1 | 5/2001 | Beming et al. | 370/335 |
| 6,292,471 | B1 | 9/2001 | Cao et al. | 370/252 |
| 6,335,933 | B1 | 1/2002 | Mallory | 370/394 |
| 6,374,112 | B1 | 4/2002 | Widegren et al. | 370/352 |
| 6,400,695 | B1 | 6/2002 | Chuah et al. | 370/310 |
| 6,434,130 | B1 | 8/2002 | Soininen et al. | 370/331 |
| 6,438,119 | B1 | 8/2002 | Kim et al. | 370/335 |
| 6,438,375 | B1 | 8/2002 | Muller | 455/435.3 |
| 6,456,604 | B1 | 9/2002 | Lee et al. | 370/328 |
| 6,490,453 | B1 | 12/2002 | Lee et al. | 455/450 |
| 6,640,105 | B1 | 10/2003 | Shin | 455/453 |
| 6,675,016 | B2 | 1/2004 | Lucidarme et al. | 455/452.2 |
| 6,731,623 | B2 | 5/2004 | Lee et al. | 370/349 |
| 6,791,963 | B1 | 9/2004 | Hwang et al. | 370/342 |
| 6,804,202 | B1 | 10/2004 | Hwang | 370/282 |
| 6,807,192 | B2 | 10/2004 | Terry | 370/469 |
| 6,826,406 | B1 | 11/2004 | Vialén et al. | 455/450 |
| 6,850,540 | B1 * | 2/2005 | Peisa et al. | 370/468 |
| 6,889,050 | B1 * | 5/2005 | Willars et al. | 455/452.2 |
| 6,901,060 | B1 | 5/2005 | Lintulampi | 370/329 |
| 7,079,854 | B2 | 7/2006 | Lee et al. | 455/466 |
| 7,123,920 | B1 * | 10/2006 | Faccin et al. | 455/450 |
| 7,236,794 | B2 | 6/2007 | Shin | 455/453 |
| 7,415,046 | B2 * | 8/2008 | Beckmann et al. | 370/537 |
| 7,466,719 | B2 * | 12/2008 | Xu et al. | 370/465 |
| 7,505,783 | B2 | 3/2009 | Park et al. | 455/552.1 |
| 7,539,160 | B2 * | 5/2009 | Virtanen et al. | 370/329 |
| 7,551,576 | B2 * | 6/2009 | Ahmavaara | 370/328 |
| 7,599,384 | B2 * | 10/2009 | Vialen et al. | 370/437 |
| 7,756,159 | B2 * | 7/2010 | Hwang | 370/469 |
| RE41,773 | E * | 9/2010 | Ahmavaara et al. | 370/410 |
| 7,792,149 | B2 * | 9/2010 | Hwang et al. | 370/476 |
| 7,856,226 | B2 * | 12/2010 | Wong et al. | 455/414.1 |
| 2001/0043576 | A1 | 11/2001 | Terry | 370/328 |
| 2002/0090940 | A1 | 7/2002 | Chen et al. | 455/422 |

FOREIGN PATENT DOCUMENTS

| | | |
|---|---|---|
| WO | WO 97/34436 | 9/1997 |

OTHER PUBLICATIONS

Siemens; "Proposed Changes to UMTS YY.01: MS UTRAN Radio Interface ProtocolArchitecture V.0.1.0; TDD-FDD Harmonisation"; ETSI/STC/SMG2 UMTS L23; TDoc SMG2 UMTS-L23 130/98; Stockholm, Sweden; Jun. 23-26, 1998.

Nokia; "Overall Protocol Structure"; ETSI SMG2 L2 & L3 expert group; TDoc SMG2 UMTS-L23 187/98; Helsinki, Finland; Sep. 1-4, 1998.

Nokia; "MAC Interface to Higher Layers"; ETSI SMG2 L2 & L3 expert group; TDoc SMG2 UMTS-L23 188/98; Helsinki, Finland; Sep. 1-4, 1998.

Nokia; "Proposed Scope of L2 Protocol Description Documents"; ETSI SMG2 L2 & L3 expert group; TDoc SMG2 UMTS-L23 198/98; Helsinki, Finland; Sep. 1-4,1998.

Nokia; "Proposed Text to YY01 for the Combined SHCH and FACH"; ETSI SMG2 L2 & L3 expert group; TDoc SMG2 UMTS-L23 239/98; Helsinki, Finland; Sep. 1-4, 1998.

Tanenbaum, Andrew S.; "Computer Networks, Third Edition"; Prentice Hall, Inc., 1996; pages: title page; publication page; 16-23 and 28-31.

IEEE Std. 802. 11, 1997; Information Technology—Telecommunications and Information Exchange Between Systems—Local and Metropolitan Area Networks-Specific Requirements—Part 11; Wireless Lan Medium Access Control (MAC) and Physical Layer (PHY) Specifications; published on Nov. 18, 1997; pages: cover; 28 and 34-36.

IEEE Std. 802.3, 1998; "Information Technology—Telecommunications and Information Exchange Between Systems—Local and Metropolitan Area Networks-Specific Requirements—Part 3; Carrier Sense Multiple Access with Collision Detection (CSMA/CD) Access Method and Physical Layer Specifications"; published on Sep. 28, 1998; pages: cover; 3, 36, 38, 4346.

TS 101 350 v6.0.1 (Aug. 1998); "Digital Cellular Telecommunications System (Phase 2+); General Packet Radio Services (GPRS); Overall Description of the GPRS Radio Interface; Stage 2 (GSM 03.64 version 6.0.1 Release 1997"; published in Aug. 1998.

TS 03 64 v2.1.1 (May 1997); "Digital Cellular Telecommunications System (Phase 2+); General Packet Radio Services (GPRS); Overall Description of the GPRS Radio Interface; Stage 2 (GSM 03.64 version 2.1.1"; published in May 1997.

Kyas, Othmar; "ATM-Netzwerke, Aufbau-Funktion-Performance"; 3. Auflage, Datacom Buchverlag, Bergheim, 1996; pages: title page, 4, 84, 85, 87, 88, 150-153, 164 and 165.

Notice of Opposition dated Sep. 27, 2007.

Korean Office Action dated Sep. 1, 2005.

"Digital Mobile Communications Seminar (2)—Technical Specifications and Technical Performance of GSM System"; 1994-2006 China Academic Journal Electronic Publishing House (Apr. 1996); pp. 34-40.

Rahnema, Moe; "Overview of the GSM System and Protocol Architecture (1)";IEEE Communications Magazine; 1993; (Apr. 1995); pp. 43-47.

Rahnema, Moe; "Overview of the GSM System and Protocol Architecture (2)"; IEEE Communications Magazine; 1993; (May 1995); pp. 39-43.

Chinese Office Action dated Dec. 8, 2006.

* cited by examiner

METHOD FOR BRANCHING DATA IN MOBILE COMMUNICATION TERMINAL

CROSS-REFERENCE TO RELATED APPLICATIONS

This application is a Divisional Application of prior U.S. patent application Ser. No. 11/699,987 filed Jan. 31, 2007 now U.S. Pat. No. 7,782,833, which is a Continuation of prior U.S. patent application Ser. No. 11/029,487 filed Jan. 6, 2005 now U.S. Pat. No. 7,295,529, which is a Continuation Application of prior U.S. patent application Ser. No. 09/406,844 filed on Sep. 29, 1999 now abandoned, which claims priority under 35 U.S.C. §119 to Korean Application No. 41481/1998 filed on Oct. 1, 1998, whose entire disclosure is hereby incorporated by reference.

BACKGROUND

1. Field of the Invention

The present invention relates in general to mobile communication terminals, and more particularly to a method for branching data in a mobile communication terminal.

2. Description of the Prior Art

Until now, a conventional mobile communication system has provided only a pure speech service or a simple short message service (referred to hereinafter as SMS). With a third-generation mobile communication system being developed, there have recently been proposed a multimedia service and short/long packet services.

Such third-generation services require a new layer, which is called a media access control (referred to hereinafter as MAC) sublayer.

The MAC sublayer has to perform a branching operation suitable to a service characteristic in order to appropriately process a variety of services.

However, the conventional mobile communication system is disadvantageous in that the MAC sublayer cannot efficiently branch various multimedia and packet services because the system provides only simple services such as the SMS.

SUMMARY OF THE INVENTION

Therefore, the present invention has been made in view of the above problem, and it is an object of the present invention to provide a method for branching data in a mobile communication terminal, in which a media access control sublayer attaches logical channel types based on traffic characteristic identifiers from a radio resource control layer and other upper layers to a media access control header and performs mapping and multiplexing/demultiplexing between logical channels and transport channels according to the attached logical channel types to branch the data.

In accordance with one aspect of the present invention, in a method for performing data communication between a mobile station and a network which have media access control sublayers, respectively, there is provided a method for branching data in a mobile communication terminal, comprising the first step of allowing each of the media access control sublayers of the mobile station and network to attach logical channel types based on traffic characteristic information and a radio bearer status to a media access control header contained in data to be sent, in a data sending mode; the second step of allowing each of the media access control sublayers to branch the data to be sent, to transport channels corresponding to the attached logical channel types; the third step of allowing each of the media access control sublayers to determine logical channels corresponding to logical channel types of a media access control header contained in received data in a data receiving mode; and the fourth step of allowing each of the media access control sublayers to branch the received data to the determined logical channels.

Preferably, each of the second and fourth steps may include the step of allowing each of the media access control sublayers to perform a channel mapping operation in a one-to-one manner, a channel multiplexing operation in a many-to-one manner and a channel demultiplexing operation in a one-to-many manner to branch the data to be sent or the received data.

Further, preferably, the traffic characteristic information may include traffic characteristic identifiers transferred from a radio resource control layer and other upper layers.

Further, preferably, each of the traffic characteristic identifiers may represent any one of random access data, synchronization data, system information, paging information, forward access grant information, short message service data, no radio bearer-type short packet data, signaling data, radio bearer-type short/long packet data, multicast signaling data, multicast data and speech characteristics.

In accordance with another aspect of the present invention, in a method for performing data communication between a mobile station and a network which have media access control sublayers, respectively, there is provided a method for branching data in a mobile communication terminal, comprising the first step of allowing each of said media access control sublayers of said mobile station and network to set information regarding connection between logical channels and transport channels on the basis of traffic characteristic information and a radio bearer status; the second step of allowing each of said media access control sublayers to attach logical channel types based on the set connection information to a media access control header contained in data to be sent, in a data sending mode; and the third step of allowing each of said media access control sublayers to branch said data to be sent, to transport channels corresponding to the attached logical channel types.

In a feature of the present invention, a media access control sublayer attaches logical channel types based on traffic characteristic identifiers from a radio resource control layer and other upper layers to a media access control header and performs mapping and multiplexing/demultiplexing between logical channels and transport channels according to the attached logical channel types to branch data. This makes it possible to efficiently provide various multimedia and packet services.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1A:
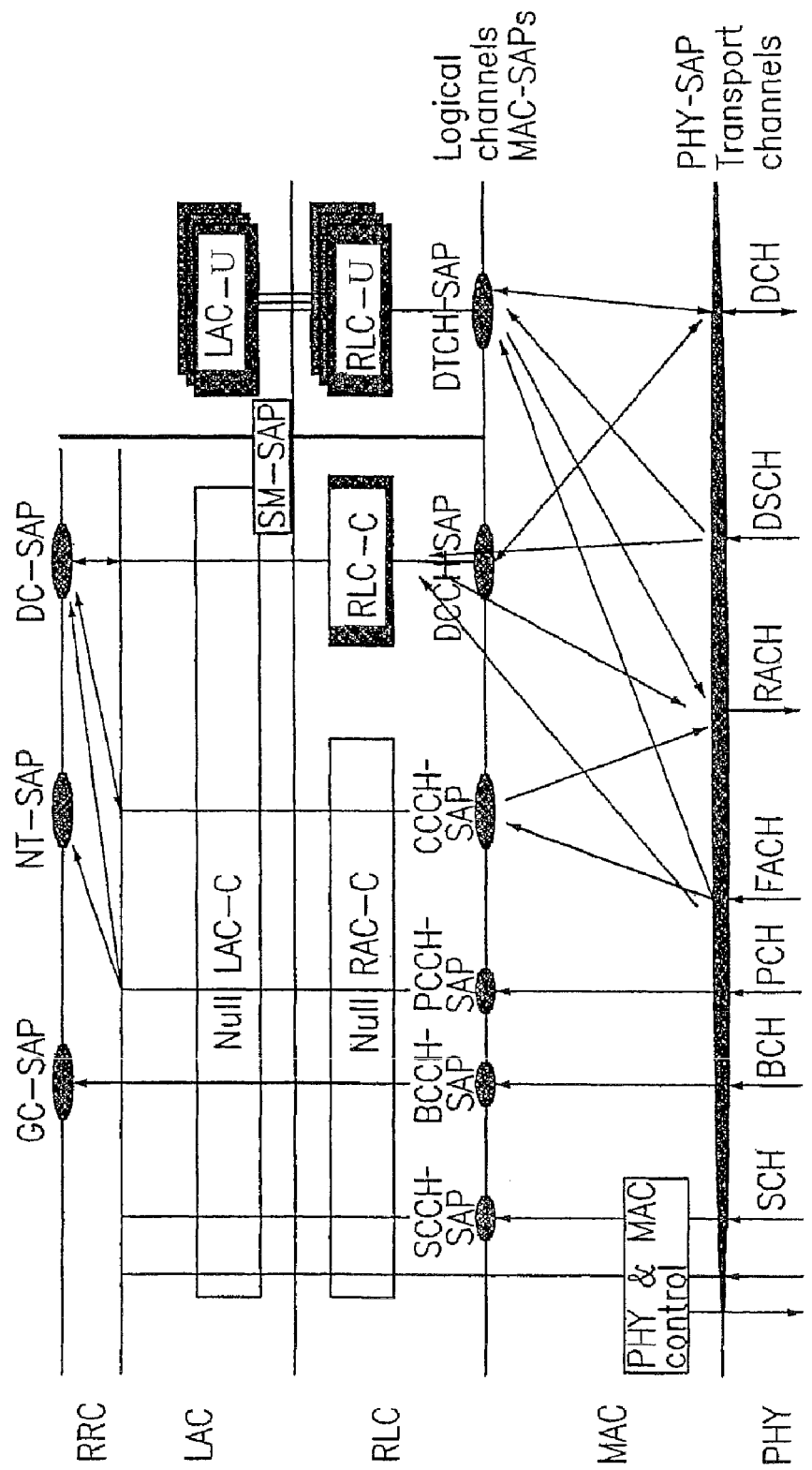
FIGS. 1a and 1b are views illustrating data branched states between mobile and base stations to which a method for branching data in a mobile communication terminal in accordance with the present invention is applied.
Figure 1B:
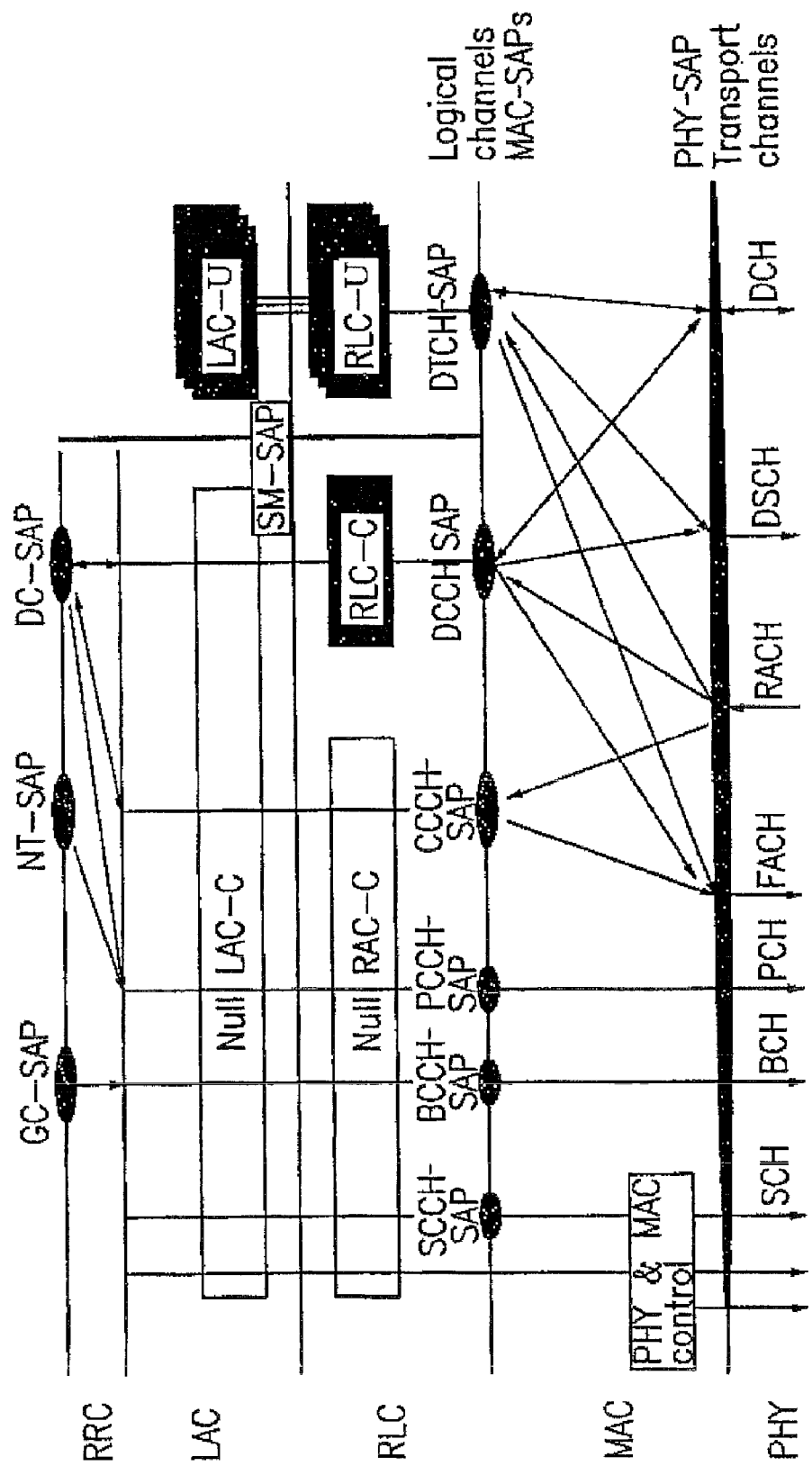

FIGS. 1a and 1b are views illustrating data branched states between mobile and base stations to which a method for branching data in a mobile communication terminal in accordance with the present invention is applied.

A method for branching data in a mobile communication terminal in accordance with the present invention will hereinafter be described in detail with reference to FIGS. 1a and 1b.

As shown in FIGS. 1a and 1b, channels associated with a MAC sublayer are classified into logical channels and transport channels.

The logical channels are mapped into MAC-service access points (referred to hereinafter as SAPs) in interfaces between the MAC sublayer and upper layers, respectively.

The above logical channels may generally be classified into a synchronization control channel (referred to hereinafter as SCCH) for transferring system synchronization data in simplex through a downlink, a broadcast control channel (referred to hereinafter as BCCH) for broadcasting system information in simplex through the downlink, a paging control channel (referred to hereinafter as PCCH) for transferring paging information in simplex through the downlink, a common control channel (referred to hereinafter as CCCH) for transferring random access data, forward access control data and short packet data in duplex through the downlink and an uplink, a dedicated control channel (referred to hereinafter as DCCH) for transferring dedicated signal control information in duplex through the downlink and uplink, and a dedicated traffic channel (referred to hereinafter as DTCH) for transferring dedicated user long/short packet data in duplex through the downlink and uplink.

The CCCH, DCCH and DTCH are adapted to transfer some data on the basis of the connection between the MAC sublayer and a radio resource control (referred to hereinafter as RRC) layer and the presence of a radio bearer. Namely, the CCCH transfers random access data under the condition that the RRC layer is not connected to the MAC sublayer, and the DCCH transfers SMS data, signaling data and a multicast signal under the condition that the RRC layer is connected to the MAC sublayer. The DTCH transfers short/multicast packet data under the condition that no radio bearer is present and short/long/multicast packet data under the condition that a radio bearer is present.

The above multicast signal, short/multicast packet data and short/long/multicast packet data are available only on a network.

The transport channels are mapped into physical (referred to hereinafter as PHY)-SAPs in interfaces between the MAC sublayer and PHY layers, respectively.

The above transport channels may generally be classified into a synchronization channel (referred to hereinafter as SCH) including first and second channels for transferring a system synchronization signal, a broadcast channel (referred to hereinafter as BCH) for broadcasting system information in simplex through the downlink, a paging channel (referred to hereinafter as PCH) for transferring paging information in simplex through the downlink, a forward access channel (referred to hereinafter as FACH) for transferring forward access grant information and short packet data in simplex through the downlink, a random access channel (referred to hereinafter as RACH) for transferring random access data and short packet data in simplex through the uplink, a downlink shared channel (referred to hereinafter as DSCH) for multicasting user data in simplex through the downlink, and a dedicated channel (referred to hereinafter as DCH) for transferring dedicated signal information and dedicated user data in duplex through the downlink and uplink.

On the other hand, in a sending entity, the MAC sublayer has to create a MAC protocol data unit (PDU) with a MAC header including a type of a logical channel through which upper layer data is to be transferred. In a receiving entity, the MAC sublayer utilizes the logical channel type of the MAC header to determine a logical channel into which the received MAC PDU is to be demultiplexed. This procedure will hereinafter be described in detail while being classified into channel mapping and channel multiplexing/demultiplexing between a mobile station and a network.

First, a description will be given of a channel mapping operation for data sending and reception between the mobile station and network.

The channel mapping operation is performed in the mobile station in the following manner.

In the case where the mobile station is to send data to the network, the MAC sublayer of the mobile station maps the CCCH which is a logical channel for transferring random access data, to the RACH which is a transport channel, in a one-to-one manner.

In the case where the mobile station is to receive data from the network, the MAC sublayer of the mobile station maps the SCH which is a transport channel for transferring signaling data, the BCH which is a transport channel for transferring system information and the PCH which is a transport channel for transferring paging information, respectively, to the SCCH, BCCH and PCCH which are logical channels, in the one-to-one manner.

The channel mapping operation is performed in the network in the following manner.

In the case where the network is to send data to the mobile station, the MAC sublayer of the network maps the SCCH which is a logical channel for transferring system synchronization data, the BCCH which is a logical channel for transferring system information, the PCCH which is a logical channel for transferring paging information and the CCCH which is a logical channel for transferring forward access grant information, respectively, to the SCH, BCH, PCH and FACH which are transport channels, in the one-to-one manner.

Noticeably, the channel mapping operation is not performed in the network with respect to data which is sent from the mobile station to the network.

Next, a description will be given of channel multiplexing/demultiplexing operations of the mobile station.

The channel multiplexing operation of the mobile station is performed in the following manner.

First, the RRC layer and other upper layers of the mobile station transfer traffic characteristic identifiers to the MAC sublayer of the mobile station.

The MAC sublayer of the mobile station attaches logical channel types based on traffic characteristics of the traffic characteristic identifiers from the RRC layer and other upper layers to a MAC header. Then, the MAC sublayer branches data to transport channels corresponding to the attached logical channel types through PHY-SAPs.

The traffic characteristics may generally be random access data, synchronization data, system information, paging information, forward access grant information, SMS data, short packet data (no radio bearer), signaling data, short/long packet data (radio bearer), multicast signaling data, multicast data and speech characteristics.

For example, if the random access data, SMS data and no radio bearer-type short packet data characteristics are required, the MAC sublayer of the mobile station attaches types of the CCCH, DCCH and DTCH to the MAC header and multiplexes the CCCH, DCCH and DTCH to the RACH in a many-to-one manner to branch data through PHY-SAPs. Here, the CCCH is a logical channel for transferring random access data, the DCCH is a logical channel for transferring SMS data, the DTCH is a logical channel for transferring no radio bearer-type short packet data, and the RACH is a transport channel.

In the case where the signaling data and radio bearer-type short/long packet data characteristics are required, the MAC sublayer of the mobile station attaches types of the DCCH and DTCH to the MAC header and multiplexes the DCCH and DTCH to the DCH in the many-to-one manner to branch data through PHY-SAPs. Here, the DCCH is a logical channel for transferring signaling data, the DTCH is a logical channel for transferring radio bearer-type short/long packet data, and the DCH is a transport channel.

The channel demultiplexing operation of the mobile station is performed in the following manner.

The network, or sending entity, attaches logical channel types based on traffic characteristics to a MAC header and the mobile station, or receiving entity, performs the channel demultiplexing operation on the basis of the logical channel types attached to the MAC header.

For example, if a transport channel through which data from the network, or sending entity, is sent is the FACH, the MAC sublayer of the mobile station demultiplexes the FACH to logical channels corresponding to traffic characteristics of logical channel types attached to a MAC header of the sent data in a one-to-many manner to branch the sent data to upper layers through MAC-SAPs.

That is, for example, in the case where the forward access grant information, SMS data and no radio bearer-type short packet data characteristics are required by the sending entity, the MAC sublayer of the mobile station recognizes that logical channel types attached to a MAC header of received data correspond respectively to the CCCH, DCCH and DTCH and demultiplexes the FACH to the CCCH, DCCH and DTCH in the one-to-many manner to branch the received data to upper layers through MAC-SAPs. Here, the FACH is a transport channel, and the CCCH, DCCH and DTCH are logical channels.

If the multicast signaling data and multicast data characteristics are required by the sending entity, the MAC sublayer of the mobile station recognizes that logical channel types attached to a MAC header of received data correspond respectively to the DCCH and DTCH and demultiplexes the DSCH to the DCCH and DTCH in the one-to-many manner to branch the received data to upper layers through MAC-SAPs. Here, the DSCH is a transport channel, and the DCCH and DTCH are logical channels.

In the case where the dedicated signaling data and radio bearer-type short/long packet data characteristics are required by the sending entity, the MAC sublayer of the mobile station recognizes that logical channel types attached to a MAC header of received data correspond respectively to the DCCH and DTCH and demultiplexes the DCH to the DCCH and DTCH in the one-to-many manner to branch the received data to upper layers through MAC-SAPs. Here, the DCH is a transport channel, and the DCCH and DTCH are logical channels.

Finally, a description will be given of channel multiplexing/demultiplexing operations of the network.

The channel multiplexing operation of the network is performed in the following manner.

First, the RRC layer and other upper layers of the network transfer traffic characteristic identifiers to the MAC sublayer of the network.

The MAC sublayer of the network attaches logical channel types based on traffic characteristics of the traffic characteristic identifiers from the RRC layer and other upper layers to a MAC header. Then, the MAC sublayer branches data to transport channels corresponding to the attached logical channel types.

The traffic characteristics may generally be random access data, synchronization data, system information, paging information, forward access grant information, SMS data, short packet data (no radio bearer), signaling data, short/long packet data (radio bearer), multicast signaling data, multicast data and speech characteristics.

For example, in the case where the forward access grant information, SMS data and no radio bearer-type short packet data characteristics are required, the MAC sublayer of the network attaches types of the CCCH, DCCH and DTCH to the MAC header and multiplexes the CCCH, DCCH and DTCH to the FACH in the many-to-one manner to branch data through PHY-SAPs. Here, the CCCH is a logical channel for transferring forward access grant information, the DCCH is a logical channel for transferring SMS data, the DTCH is a logical channel for transferring no radio bearer-type short packet data, and the FACH is a transport channel.

If the multicast signaling data and multicast data characteristics are required, the MAC sublayer of the network attaches types of the DCCH and DTCH to the MAC header and multiplexes the DCCH and DTCH to the DSCH in the many-to-one manner to branch data through PHY-SAPs. Here, the DCCH is a logical channel for transferring multicast signaling data, the DTCH is a logical channel for transferring multicast data, and the DSCH is a transport channel.

In the case where the signaling data and radio bearer-type short/long packet data characteristics are required, the MAC sublayer of the network attaches types of the DCCH and DTCH to the MAC header and multiplexes the DCCH and DTCH to the DCH in the many-to-one manner to branch data through PHY-SAPs. Here, the DCCH is a logical channel for transferring signaling data, the DTCH is a logical channel for transferring radio bearer-type short/long packet data, and the DCH is a transport channel.

The channel demultiplexing operation of the network is performed in the following manner.

The mobile station, or sending entity, attaches logical channel types based on traffic characteristics to a MAC header and the network, or receiving entity, performs the channel demultiplexing operation on the basis of the logical channel types attached to the MAC header.

For example, in the case where a transport channel through which data from the mobile station, or sending entity, is sent is the RACH, the MAC sublayer of the network demultiplexes the RACH to logical channels corresponding to traffic characteristics of logical channel types attached to a MAC header of the sent data in the one-to-many manner to branch the sent data to upper layers through MAC-SAPs.

Namely, for example, if the forward access grant information, SMS data and no radio bearer-type short packet data characteristics are required by the sending entity, the MAC sublayer of the network recognizes that logical channel types attached to a MAC header of received data correspond respectively to the CCCH, DCCH and DTCH and demultiplexes the RACH to the CCCH, DCCH and DTCH in the one-to-many manner to branch the received data to upper layers through MAC-SAPs. Here, the RACH is a transport channel, and the CCCH, DCCH and DTCH are logical channels.

In the case where the dedicated signaling data and radio bearer-type short/long packet data characteristics are required by the sending entity, the MAC sublayer of the network recognizes that logical channel types attached to a MAC header of received data correspond respectively to the DCCH and DTCH and demultiplexes the DCH to the DCCH and DTCH in the one-to-many manner to branch the received data to upper layers through MAC-SAPs. Here, the DCH is a transport channel, and the DCCH and DTCH are logical channels.

As apparent from the above description, according to the present invention, the MAC sublayer performs mapping and multiplexing/demultiplexing between logical channels and transport channels according to traffic characteristics to branch data. Therefore, the present invention has the effect of efficiently providing various multimedia and packet services.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of performing data communication between a mobile station and a network, each having a medium access control (MAC) layer, the method comprising:
    mapping a dedicated control channel (DCCH), which is a logical channel, to at least two transport channels for a MAC layer protocol; and
    mapping a dedicated traffic channel (DTCH), which is a logical channel, to said at least two transport channels for the MAC layer protocol,
    providing, during data transmission mode, a MAC protocol data unit (PDU) to be transmitted to a receiving side, the MAC PDU having a header and data, the header including information indicative of a logical channel type which indicates a logical channel through which the data is transferred,
    wherein the DCCH and the DTCH are located between a radio link control (RLC) layer and the MAC layer, and said at least two transport channels are located between the MAC layer and a physical layer.

2. The method of claim 1, wherein the at least two transport channels include a forward access channel (FACH).

3. The method of claim 2, wherein the forward access channel (FACH) is a downlink channel.

4. The method of claim 1, wherein the at least two transport channels include a random access channel (RACH).

5. The method of claim 4, wherein the random access channel (RACH) is an uplink channel.

6. The method of claim 1, wherein the at least two transport channels include a downlink shared channel (DSCH).

7. The method of claim 1, wherein the at least two transport channels include a dedicated channel (DCH).

8. The method of claim 1, wherein the dedicated control channel (DCCH) and the dedicated traffic channel (DTCH) are bi-directional channels.

9. An apparatus for performing data communication in a mobile communication system, the apparatus having a medium access control (MAC) layer, the apparatus comprising:
    means for mapping a dedicated control channel (DCCH), which is a logical channel, to at least two transport channels for a MAC layer protocol; and
    means for mapping a dedicated traffic channel (DTCH), which is a logical channel, to said at least two transport channels for the MAC layer protocol,
    means for providing, during data transmission mode, a MAC protocol data unit (PDU) to be transmitted to a receiving side, the MAC PDU having a header and data, the header including information indicative of a logical channel type which indicates a logical channel through which the data is transferred, wherein the DCCH and the DTCH are located between a radio link control (RLC) layer and the MAC layer, and said at least two transport channels are located between the MAC layer and a physical layer.

10. The apparatus of claim 9, wherein the at least two transport channels include a forward access channel (FACH).

11. The apparatus of claim 9, wherein the at least two transport channels include a random access channel (RACH).

12. The apparatus of claim 11, wherein the random access channel (RACH) is an uplink channel.

13. The apparatus of claim 9, wherein the at least two transport channels include a downlink shared channel (DSCH).

14. The apparatus of claim 9, wherein the at least two transport channels include a dedicated channel (DCH).

15. The apparatus of claim 9, wherein the dedicated control channel (DCCH) and the dedicated traffic channel (DTCH) are bi-directional channels.

16. The apparatus of claim 10, wherein the forward access channel (EACH) is a downlink channel.

* * * * *